(12) United States Patent
Lai et al.

(10) Patent No.: US 10,206,506 B1
(45) Date of Patent: Feb. 19, 2019

(54) FRAME WITH CONNECTING AND POSITIONING STRUCTURE

(71) Applicant: Shenter Enterprise Co., Ltd., Chang-Hua Hsien (TW)

(72) Inventors: Ming-Hsiao Lai, Chang-Hua Hsien (TW); Kuo-Shu Huang, Changhua (TW)

(73) Assignee: SHENTER ENTERPRISE CO., LTD., Chang-Hua Hsien (TW)

( * ) Notice: Subject to any disclaimer, the term of this patent is extended or adjusted under 35 U.S.C. 154(b) by 0 days.

(21) Appl. No.: 16/030,353

(22) Filed: Jul. 9, 2018

(51) Int. Cl.
| A47B 95/00 | (2006.01) |
| A47B 96/14 | (2006.01) |
| A47B 47/00 | (2006.01) |
| A47B 57/40 | (2006.01) |

(52) U.S. Cl.
CPC .......... *A47B 95/00* (2013.01); *A47B 96/1433* (2013.01); *A47B 96/1441* (2013.01); *A47B 47/00* (2013.01); *A47B 47/0008* (2013.01); *A47B 57/40* (2013.01); *A47B 2220/0002* (2013.01)

(58) Field of Classification Search
CPC . A47B 95/00; A47B 96/1441; A47B 96/1433; A47B 2220/0002; A47B 47/008; A47B 57/40; A47B 47/00
USPC ...... 211/189, 207, 190, 192, 13.1, 175, 208, 211/195, 162, 187; 403/187, 189, 245, 403/246, 231; 52/655.1, 653.2, 710; 248/159, 220.22, 222.13, 223.31, 223.41, 248/224.51, 224.61; 312/111
See application file for complete search history.

(56) References Cited

U.S. PATENT DOCUMENTS

| 685,689 | A | * | 10/1901 | Millikan | A47F 7/30 |
| | | | | | 211/175 |
| 867,661 | A | * | 10/1907 | Keating | A47F 7/30 |
| | | | | | 211/182 |
| 2,805,776 | A | * | 9/1957 | Levitin | A47F 7/30 |
| | | | | | 211/207 |
| 2,905,232 | A | * | 9/1959 | Umphred, Jr. | A47C 7/00 |
| | | | | | 248/188.1 |
| 3,082,711 | A | * | 3/1963 | Vetere | A47B 57/265 |
| | | | | | 108/107 |

(Continued)

*Primary Examiner* — Jonathan Liu
*Assistant Examiner* — Devin K Barnett
(74) *Attorney, Agent, or Firm* — Egbert Law Offices, PLLC (57) ABSTRACT

Disclosed is a frame with connecting and positioning structure. The frame has a plurality of cross bars and vertical bars which are correspondingly connected through the connecting and positioning structure. The connecting and positioning structure includes: a fixing seat fixed to the end of the cross bar; a fitting groove on the fixing seat; one end of the fitting groove is extended toward the bottom edge of the cross bar to form an opening end; an embedded block is provided for embedding in the retaining groove of the vertical bar; a plug-in column is connected with the embedded block; a fitting convex portion is connected to the other end of the plug-in column, and the fitting convex portion and the plug-in column are correspondingly inserted into the fitting groove; and a fixing member penetrates through the embedded block, the fitting convex portion, and the plug-in column to connect them together.

5 Claims, 9 Drawing Sheets

(56) References Cited

U.S. PATENT DOCUMENTS

| | | | | |
|---|---|---|---|---|
| 3,106,297 A * | 10/1963 | Schroeder | A47B 57/40 | 211/187 |
| 3,261,625 A * | 7/1966 | Cripe | E04B 2/764 | 403/173 |
| 3,494,478 A * | 2/1970 | Link | A47B 47/027 | 211/182 |
| 3,498,654 A * | 3/1970 | Hector | F16B 7/00 | 248/188.1 |
| 3,540,175 A * | 11/1970 | Hawn | E04B 5/12 | 52/126.6 |
| 3,829,999 A * | 8/1974 | Bernstein | G09F 15/0068 | 40/605 |
| 3,847,489 A * | 11/1974 | Van Riper | A47B 57/54 | 211/207 |
| 3,848,844 A * | 11/1974 | Barrett | A47B 57/56 | 108/106 |
| 3,879,017 A * | 4/1975 | Maxcy | B62D 33/044 | 256/22 |
| 3,901,612 A * | 8/1975 | Canin | F16B 7/187 | 403/189 |
| 3,945,742 A * | 3/1976 | Condevaux | F16B 7/0466 | 403/255 |
| 3,969,031 A * | 7/1976 | Kroopp | B62D 33/044 | 403/239 |
| 4,021,129 A * | 5/1977 | Sykes | F16B 12/32 | 403/252 |
| 4,056,196 A * | 11/1977 | Brauning | A47B 57/54 | 211/207 |
| 4,212,445 A * | 7/1980 | Hagen | F16B 12/34 | 248/222.52 |
| 4,250,679 A * | 2/1981 | Burg | A47B 57/40 | 52/653.2 |
| 4,369,953 A * | 1/1983 | Greiner | E04H 17/143 | 256/24 |
| 4,488,844 A * | 12/1984 | Baubles | F16B 37/045 | 411/103 |
| 4,490,064 A * | 12/1984 | Ducharme | A47B 47/0008 | 403/255 |
| 4,583,359 A * | 4/1986 | Staeger | E04B 1/5837 | 52/653.2 |
| 5,154,385 A * | 10/1992 | Lindberg | A47B 57/562 | 248/225.11 |
| 5,192,145 A * | 3/1993 | Rixen | F16B 7/187 | 403/255 |
| 5,308,037 A * | 5/1994 | Gonzalez | F24F 13/32 | 248/670 |
| 5,407,171 A * | 4/1995 | Gonzalez | F16M 5/00 | 248/670 |
| 5,580,181 A * | 12/1996 | Nomura | A47B 47/0016 | 403/170 |
| 5,695,174 A * | 12/1997 | Tsai | E04H 12/2215 | 256/19 |
| 5,729,948 A * | 3/1998 | Levy | E04B 1/2604 | 297/153 |
| 5,820,289 A * | 10/1998 | Kern | H02B 1/01 | 403/231 |
| 5,971,365 A * | 10/1999 | Pigott | B23K 9/0026 | 256/24 |
| 6,029,954 A * | 2/2000 | Murdaca | E04F 11/1834 | 256/59 |
| 6,032,431 A * | 3/2000 | Sugiyama | E04B 1/2604 | 52/656.9 |
| 6,086,300 A * | 7/2000 | Frohlich | F16B 37/045 | 411/107 |
| 6,105,794 A * | 8/2000 | Bauer | A47B 57/26 | 108/108 |
| 6,141,927 A * | 11/2000 | Usui | E01C 9/08 | 403/170 |
| 6,223,917 B1 * | 5/2001 | Bruder | A47B 47/0008 | 211/189 |
| 6,332,657 B1 * | 12/2001 | Fischer | A47B 47/0008 | 312/111 |
| 6,378,711 B1 * | 4/2002 | Skulnik | A47B 96/1441 | 211/183 |
| 6,402,420 B1 * | 6/2002 | Yang | F16B 12/32 | 403/381 |
| 6,481,177 B1 * | 11/2002 | Wood | F16B 7/187 | 403/189 |
| 6,547,088 B1 * | 4/2003 | Wang | A47B 57/26 | 211/187 |
| 6,682,253 B2 * | 1/2004 | Binna | A47B 57/26 | 403/263 |
| 6,712,540 B2 * | 3/2004 | Schmalzhofer | F16B 7/187 | 403/248 |
| 6,827,320 B2 * | 12/2004 | Yeh | A47B 57/565 | 248/220.22 |
| 7,004,667 B2 * | 2/2006 | Ludwig | E04B 9/14 | 403/258 |
| 7,037,030 B2 * | 5/2006 | McLemore | E01F 13/048 | 404/6 |
| 7,096,637 B2 * | 8/2006 | McMillan | G09F 15/0068 | 52/653.1 |
| 7,762,023 B2 * | 7/2010 | Kasdorf | E04B 2/7435 | 52/282.2 |
| 7,832,570 B1 * | 11/2010 | Reynolds | A47B 96/14 | 211/103 |
| 8,100,600 B2 * | 1/2012 | Blum | F16B 37/045 | 403/256 |
| 8,118,181 B2 * | 2/2012 | Shinozaki | A47B 47/0083 | 108/147.13 |
| 8,348,071 B1 * | 1/2013 | Janlert | F16M 5/00 | 211/175 |
| 8,353,500 B2 * | 1/2013 | Walpole | E04H 17/1421 | 256/65.03 |
| 8,376,157 B2 * | 2/2013 | Jarvis | A47B 47/045 | 108/147.12 |
| 8,397,443 B2 * | 3/2013 | Blom | E04F 15/02044 | 52/125.6 |
| 8,627,966 B2 * | 1/2014 | Jarvis | A47B 55/00 | 211/187 |
| 8,689,516 B2 * | 4/2014 | Richardson | B62D 27/023 | 52/655.1 |
| 8,707,653 B2 * | 4/2014 | Calleja | E04B 1/24 | 29/525.11 |
| 8,827,232 B2 * | 9/2014 | Crowley | A47B 43/003 | 211/175 |
| 8,961,060 B2 * | 2/2015 | Oetlinger | F16B 7/18 | 403/259 |
| 8,973,316 B2 * | 3/2015 | Safford | E04B 2/885 | 52/204.62 |
| 9,010,553 B2 * | 4/2015 | Crowley | A47B 43/003 | 211/189 |
| 9,127,504 B2 * | 9/2015 | Sprague | E06B 3/70 | |
| 9,167,896 B1 * | 10/2015 | Wu | A47B 96/1441 | |
| 9,212,675 B2 * | 12/2015 | Oetlinger | F16B 7/187 | |
| 9,226,575 B2 * | 1/2016 | Crowley | F24F 13/32 | |
| 9,782,000 B2 * | 10/2017 | Kahle | A47B 81/005 | |
| D829,028 S * | 9/2018 | Michell | D6/681 | |
| 2002/0017839 A1 * | 2/2002 | Wei | A63F 9/00 | 312/265.1 |
| 2005/0265778 A1 * | 12/2005 | Tzeng | F16B 12/52 | 403/231 |
| 2006/0086684 A1 * | 4/2006 | Wu | A47B 96/145 | 211/192 |
| 2007/0062898 A1 * | 3/2007 | Choi | A47B 57/408 | 211/192 |
| 2010/0006526 A1 * | 1/2010 | Konstant | A47B 47/021 | 211/134 |
| 2010/0078614 A1 * | 4/2010 | Graber | E04F 11/1836 | 256/65.08 |
| 2010/0084354 A1 * | 4/2010 | Eustace | A47B 57/50 | 211/134 |
| 2011/0073824 A1 * | 3/2011 | Lappin | E04F 11/1817 | 256/65.08 |
| 2011/0241502 A1 * | 10/2011 | Kao | A47B 47/0008 | 312/111 |
| 2011/0277417 A1 * | 11/2011 | Welcel | E04B 1/24 | 52/653.1 |

(56) References Cited

U.S. PATENT DOCUMENTS

| | | | |
|---|---|---|---|
| 2012/0153657 A1* | 6/2012 | Kapoor | A61G 1/06 296/19 |
| 2013/0221303 A1* | 8/2013 | Ash | E04H 17/1413 256/65.12 |
| 2013/0306808 A1* | 11/2013 | Huang | A47B 13/06 248/163.1 |
| 2014/0048678 A1* | 2/2014 | Chen | F16M 7/00 248/678 |
| 2014/0075980 A1* | 3/2014 | Villar | F24F 13/32 62/297 |
| 2015/0272322 A1* | 10/2015 | Wu | A47B 47/005 428/99 |
| 2015/0308095 A1* | 10/2015 | O'Neal | E04B 1/34315 52/653.2 |
| 2016/0017595 A1* | 1/2016 | Lee | E04B 1/3483 52/653.2 |
| 2017/0238710 A1* | 8/2017 | Tsai | A47B 96/14 |
| 2018/0116400 A1* | 5/2018 | Lu | H05K 7/1488 |

* cited by examiner

FRAME WITH CONNECTING AND POSITIONING STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a frame, and more particularly to an innovative structure of a frame with connecting and positioning structure.

2. Description of Related Art Including Information Disclosed Under 37 CFR 1.97 and 37 CFR 1.98

Rack products are very common in daily life and are used for placing and storing various items such as daily necessities, books, tools, etc. to facilitate access and make the surrounding more tidy and beautiful.

At present, the rack products on the market are quite diverse, and are usually assembled from supporting columns, frames, and laminates. However, the actual use experience of such a rack structure type still reveals the following problems. The components of the conventional rack are usually fixed by screws, so that such a combination method not only leads to a more complex assembly/disassembly process, but also takes a lot of assembly time. Furthermore, if the components of the conventional rack are fixed by welding, then the supporting columns, frames, and laminates can no longer be adjusted and replaced. It is difficult to meet the different needs of consumers, and there is a need for improvement.

BRIEF SUMMARY OF THE INVENTION

Based on the foregoing objective, the present invention provides a frame with connecting and positioning structure. The frame has a plurality of cross bars and a plurality of vertical bars, and the cross bars and the vertical bars are correspondingly connected through the connecting and positioning structure. The connecting and positioning structure comprises: a fixing seat which is fixed to the end of the cross bar and has a plate body for covering the end face of the cross bar; a fitting groove which is provided on the fixing seat and its plate body; one end of the fitting groove is extended toward the bottom edge of the cross bar to form an opening end, and the fitting groove is in an inner-wide and outer-narrow structure type along the axial direction of the cross bar; an embedded block provided for embedding in the retaining groove of the vertical bar; a plug-in column which is connected with the embedded block, and a shrinkage convex portion is extended at an end of the plug-in column connected to the embedded block; a step portion is formed between the shrinkage convex portion and the plug-in column; the shrinkage convex portion is used to embed into the retaining groove, so that the plug-in column in unable to rotate relative to the vertical bar; further, the step portion rests on the wall of the opening of the retaining groove, so that the step portion and the embedded block are retained to the wall of the opening of the retaining groove; a fitting convex portion is connected to the other end of the plug-in column, and the fitting convex portion and the plug-in column coincide with the fitting groove, showing an inner-wide and outer-narrow structure pattern, for inserting into the fitting groove in a tight fit state; and a fixing member penetrating the embedded block, the fitting convex portion, and the plug-in column to connect them together.

With this innovative and unique design, in comparison with the prior art, due to the structural design of the abutment surface of the plug-in column corresponding to the closed end of the fitting groove, insertion of the fitting convex portion into the fitting groove is achieved to realize the oriented combination fool proof effect. In addition, the cross bars and the vertical bars are connected through the connecting and positioning structure without requiring any hand tools. Thus, assembly and disassembly can be easily and quickly achieved to attain the objective of saving time and convenience, which is particularly practical and progressive.

DETAILED DESCRIPTION OF THE INVENTION

Referring to FIGS. 1 to 4, which are the first embodiment of a frame with connecting and positioning structure of the present invention. However, this embodiment is for illustrative purposes only, and is not limited by the patent application. The frame 10 has a plurality of cross bars 11 and a plurality of vertical bars 12, and the cross bars 11 and the vertical bars 12 are correspondingly connected through the connecting and positioning structure 20 without requiring any hand tools. Assembly and disassembly can be easily and quickly achieved to attain the objective of saving time and convenience. The connecting and positioning structure 20 mainly comprises: a fixing seat 21 fixed to the end of the cross bar 11 and having a plate body 211 for covering the end face of the cross bar 11; a fitting groove 212 provided on the fixing seat 21 and its plate body 211; one end of the fitting groove 212 is extended toward the bottom edge of the cross bar 11 to form an opening end 213, and the fitting groove 212 is in an inner-wide and outer-narrow structure type along the axial direction of the cross bar 11; an embedded block 22 for embedding in the retaining groove 121 of the vertical bar 12; a plug-in column 23 which is connected with the embedded block 22, and a shrinkage convex portion 231 is extended at an end of the plug-in column 23 connected to the embedded block 22; a step portion 232 is formed between the shrinkage convex portion 231 and the plug-in column 23; the shrinkage convex portion 231 is used to embed into the retaining groove 121; as the shrinkage convex portion 231 is limited by the wall 122 of the opening of the retaining groove 121, the plug-in column 23 in unable to rotate relative to the vertical bar 12; further, the step portion 232 rests on the wall 122 of the opening of the retaining groove 121, so that the step portion 232 and the embedded block 22 are retained to the wall 122 of the opening of the retaining groove 121; a fitting convex portion 24 is connected to the other end of the plug-in column 23, and the fitting convex portion 24 and the plug-in column 23 coincide with the fitting groove 212, showing an inner-wide and outer-narrow structure pattern, for inserting into the fitting groove 212 in a tight fit state; and a fixing member 25 penetrating the embedded block 22, the fitting convex portion 24, and the plug-in column 23 to connect them together.

In this embodiment, a second shrinkage convex portion 214 is disposed at a position near the closed end 217 of the plate body 211 of the fixing seat 21 for inserting into the retaining groove 121. Because the second shrinkage convex portion 214 is limited by the wall 122 of the opening of the retaining groove 121, the fixing seat 21 cannot be deflected relative to the vertical bar 12. In addition, a sleeve part 215 is extended from the plate body 211 of the fixing seat 21 towards the inside of the cross bar 11, and a buckle part 216 is protruded from the bottom edge of the sleeve part 215. The inner wall of the cross rod 11 has a positioning hole 111 for the buckle part 216 to be embedded.

In this embodiment, the other end of the fitting groove 212 away from the opening end 213 extends inwardly along the radial direction of the cross bar 11 to form a closed end 217 in a concave arc shape. The closed end 217 of the fitting groove 212 is in a concave arc shape, and the plug-in column 23 has a convex arc-shaped abutment surface 233 corresponding to the closed end 217. In this way, due to the structural design of the abutment surface 233 of the plug-in column 23 corresponding to the closed end 217 of the fitting groove 212, insertion of the fitting convex portion 24 into the fitting groove 212 is achieved to realize the oriented combination fool proof effect.

In this embodiment, a positioning protrusion 241 is formed on the end face of the fitting convex portion 24 abutted against the bottom of the fitting groove 212, and a positioning groove 218 is formed on the groove wall of the fitting groove 212 adjacent to the opening end 213. The positioning protrusion 241 is selectively embedded in the positioning groove 218 to make the fitting convex portion 24 positioned in the fixing seat 21. Furthermore, a guide slope 219 is formed on the groove wall of the fitting groove 212 adjacent to the opening end 213, so that when the fixing seat 21 is inserted into the fitting groove 212, the positioning protrusion 241 is aligned with the guide slope 219 and guided by the guide slope 219 to allow the fixing seat 21 to smoothly and quickly insert into the fitting groove 212.

Figure 1:
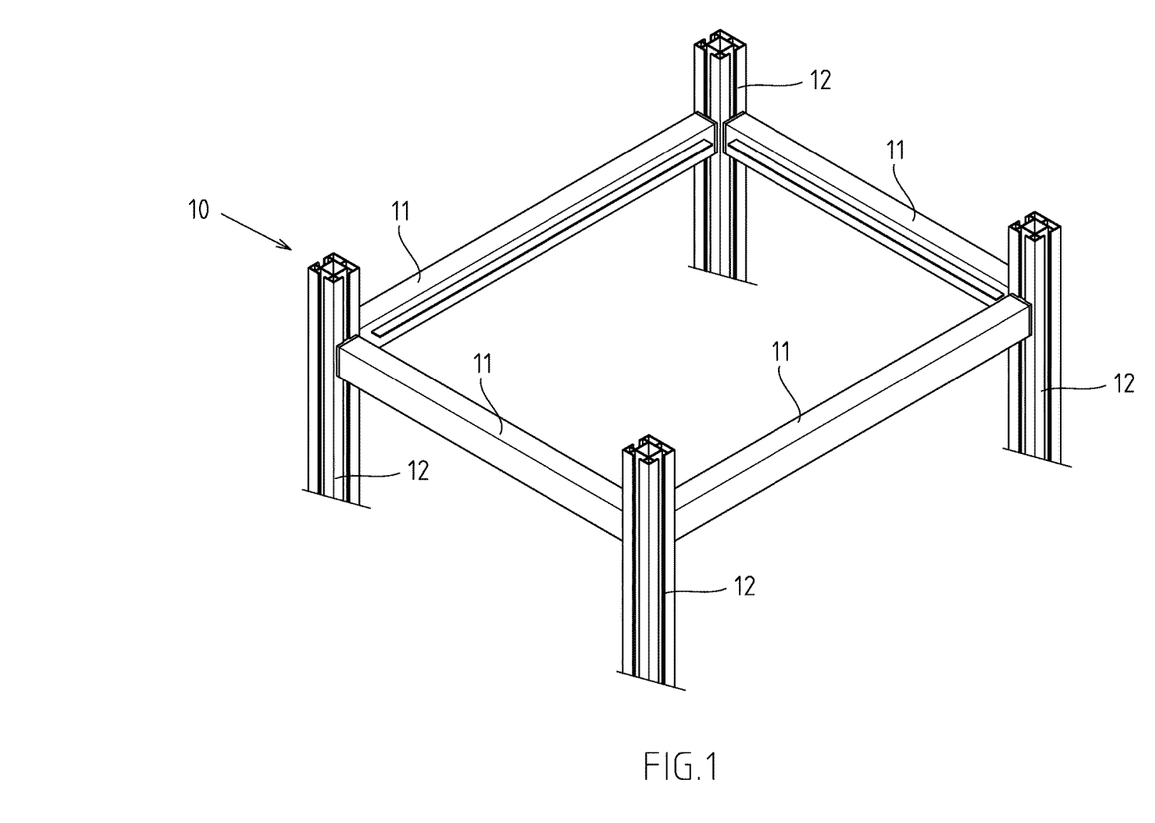
FIG. 1 is a three-dimensional assembly diagram of the first embodiment of the present invention.
Figure 2:
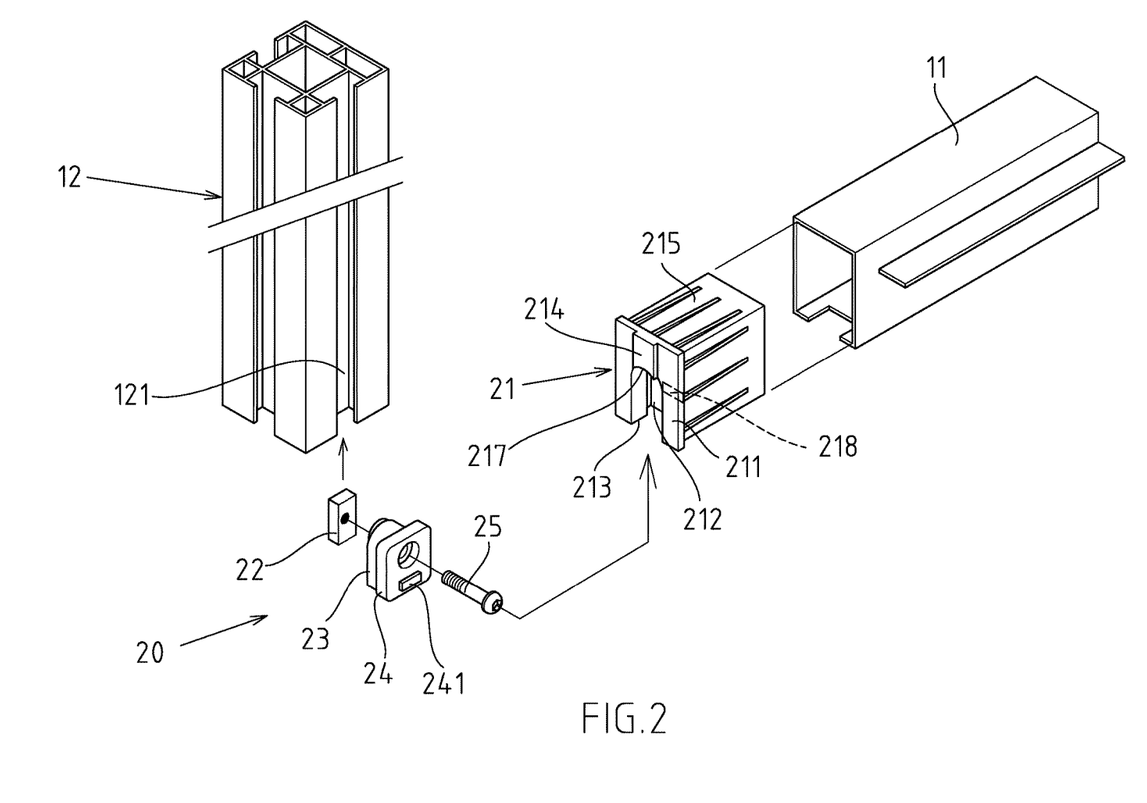
FIG. 2 is a partial exploded diagram of FIG. 1.
Figure 3:
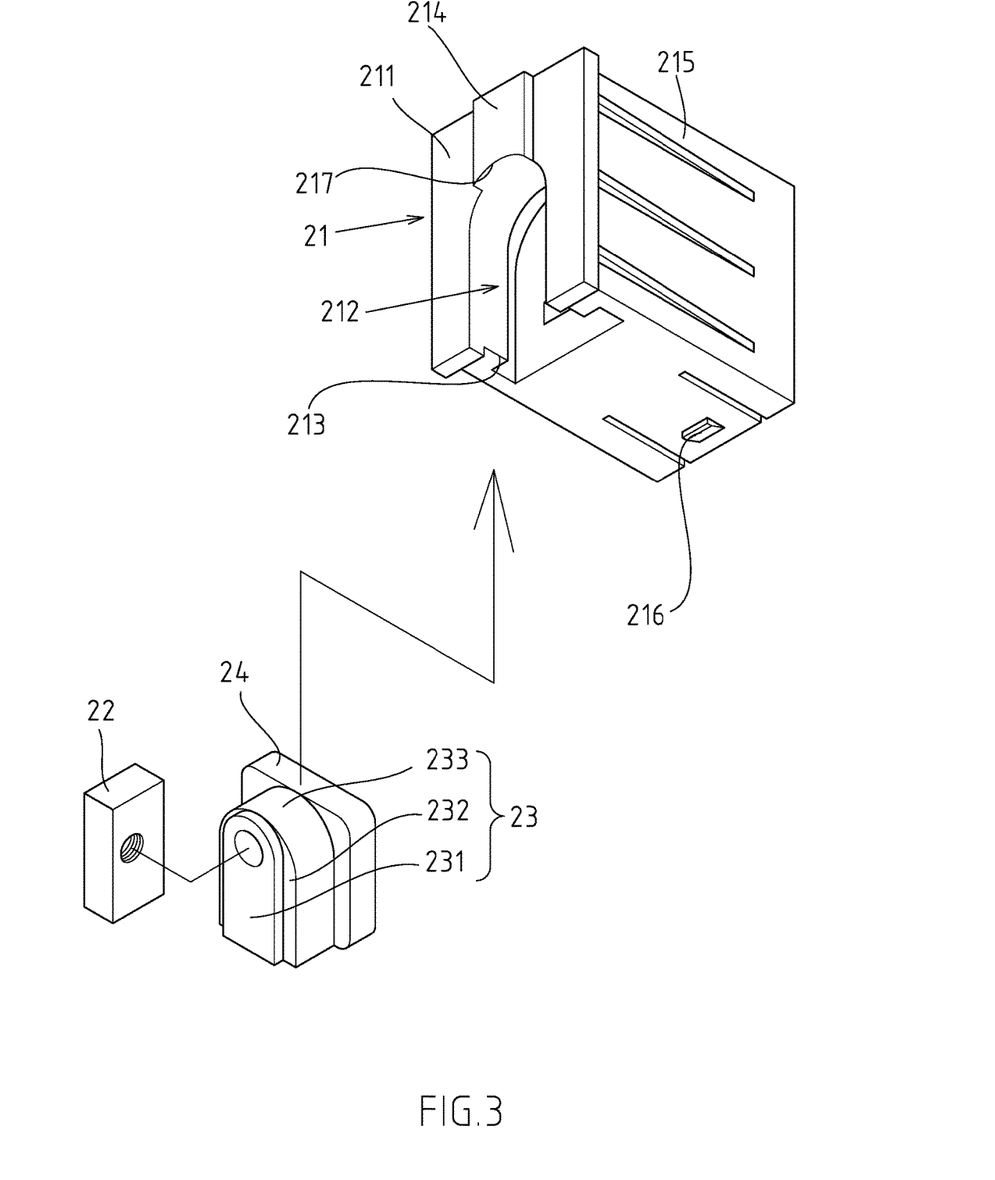
FIG. 3 shows a schematic diagram of FIG. 2 from another angle of view.
Figure 4:
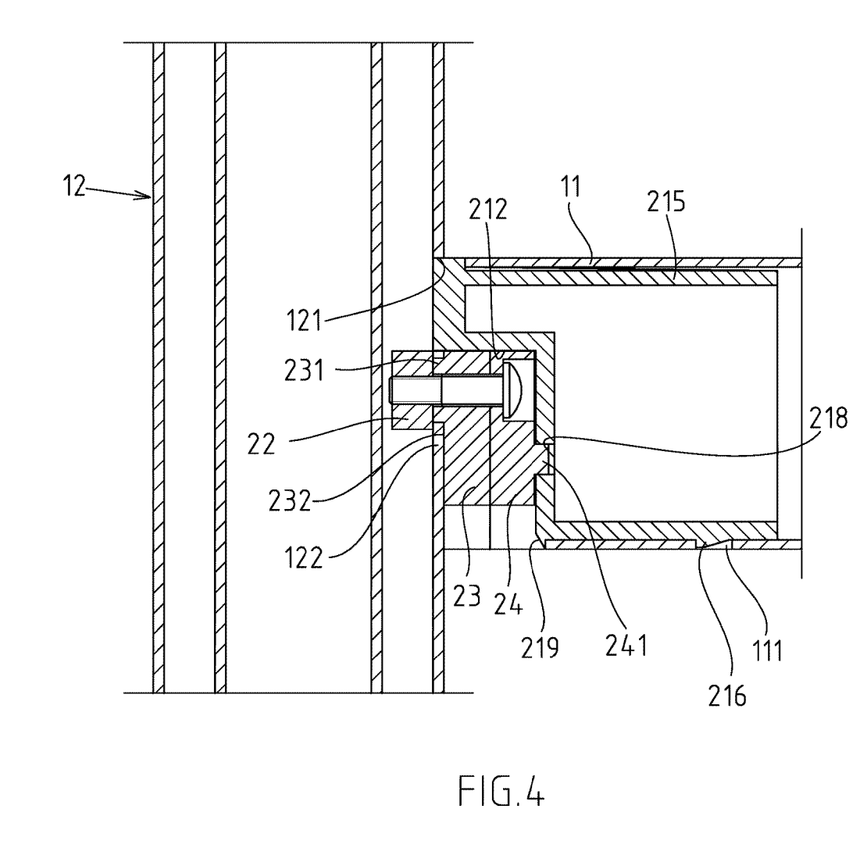
FIG. 4 is a partial assembly sectional view of FIG. 1.
Figure 5:
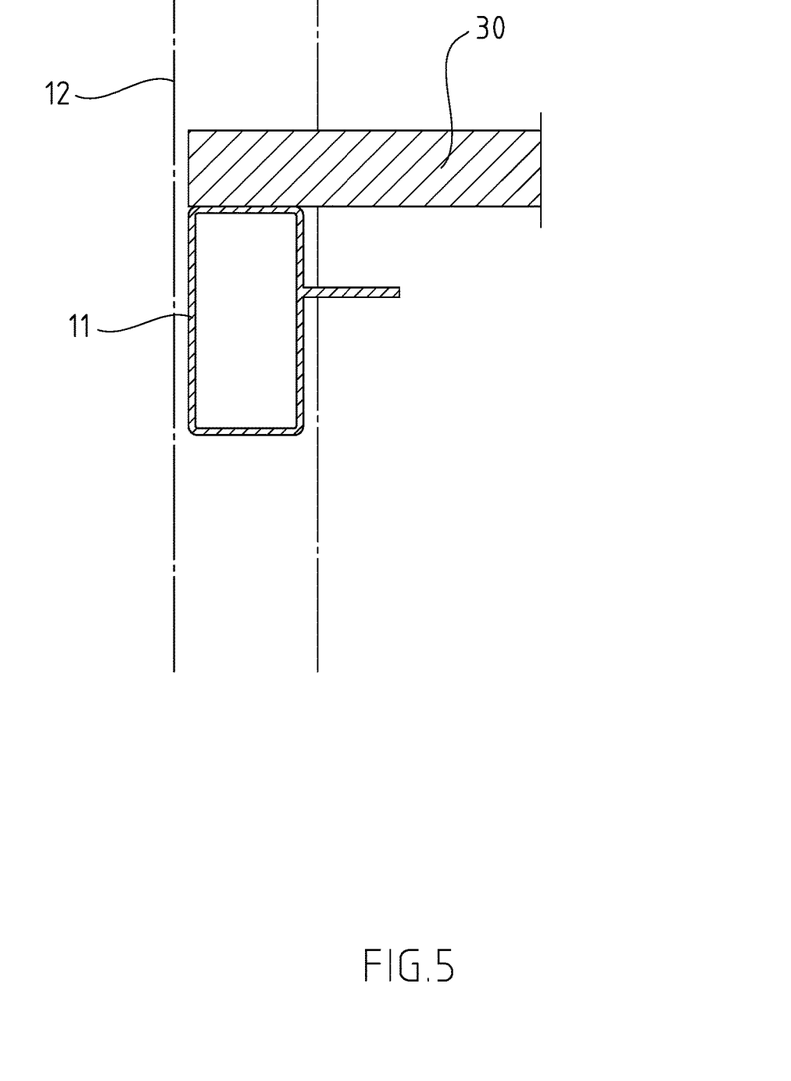
FIG. 5 is the first embodiment of placing bearing plate in FIG. 1.
Figure 6:
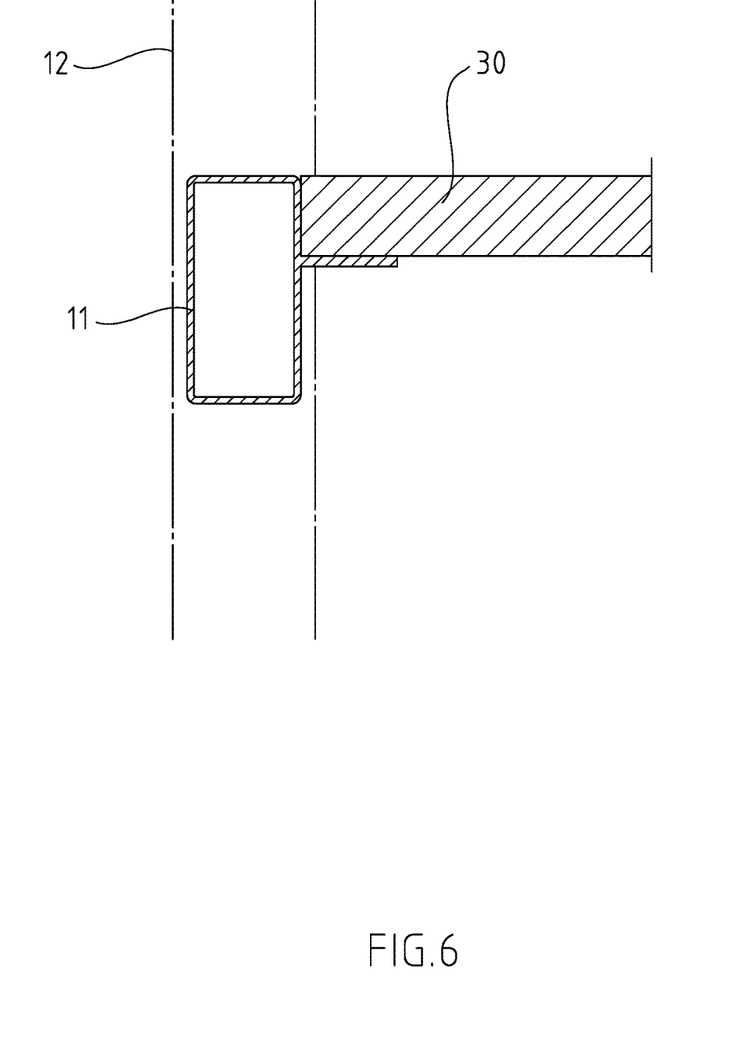
FIG. 6 is the second embodiment of placing bearing plate in FIG. 2.
Figure 7:
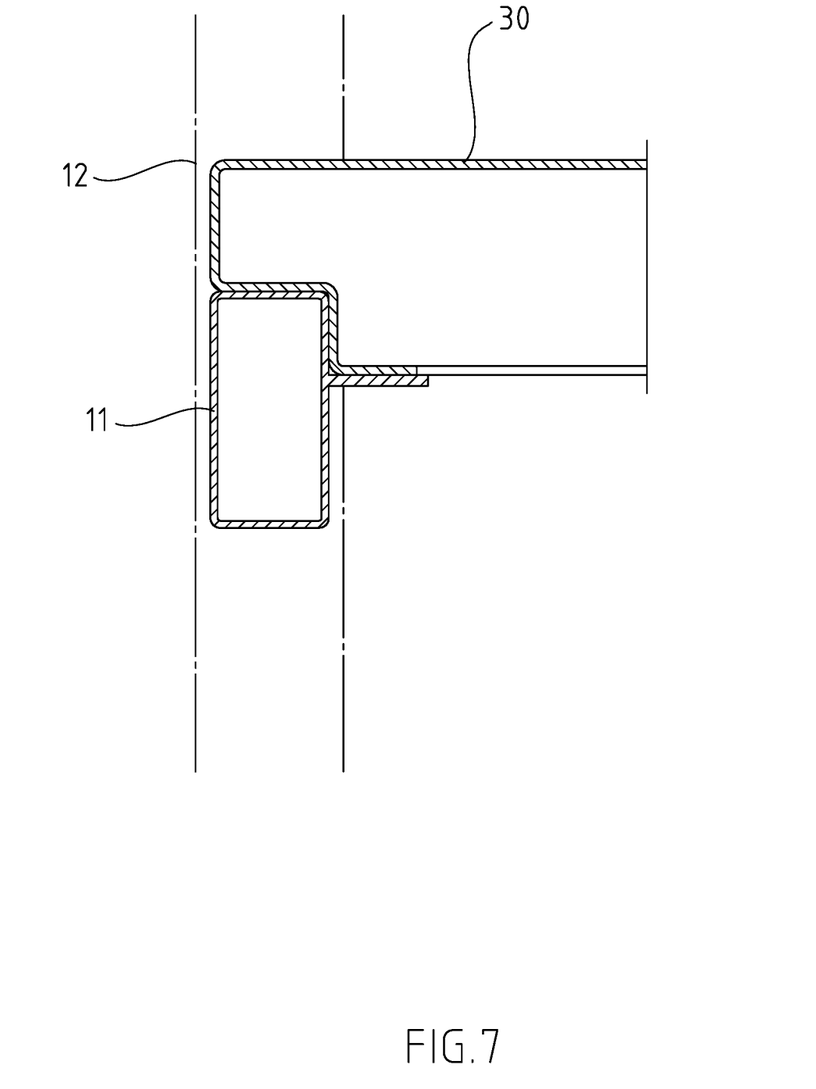
FIG. 7 is the third embodiment of placing bearing plate in FIG. 3.

As shown in FIGS. 5 to 7, the frame 10 is used for installation a bearing plate 30. After the installation, it provides the function of placing and storage. The type of the bearing plate 30 and its assembly method can be configured according to the user's needs.

Figure 8:
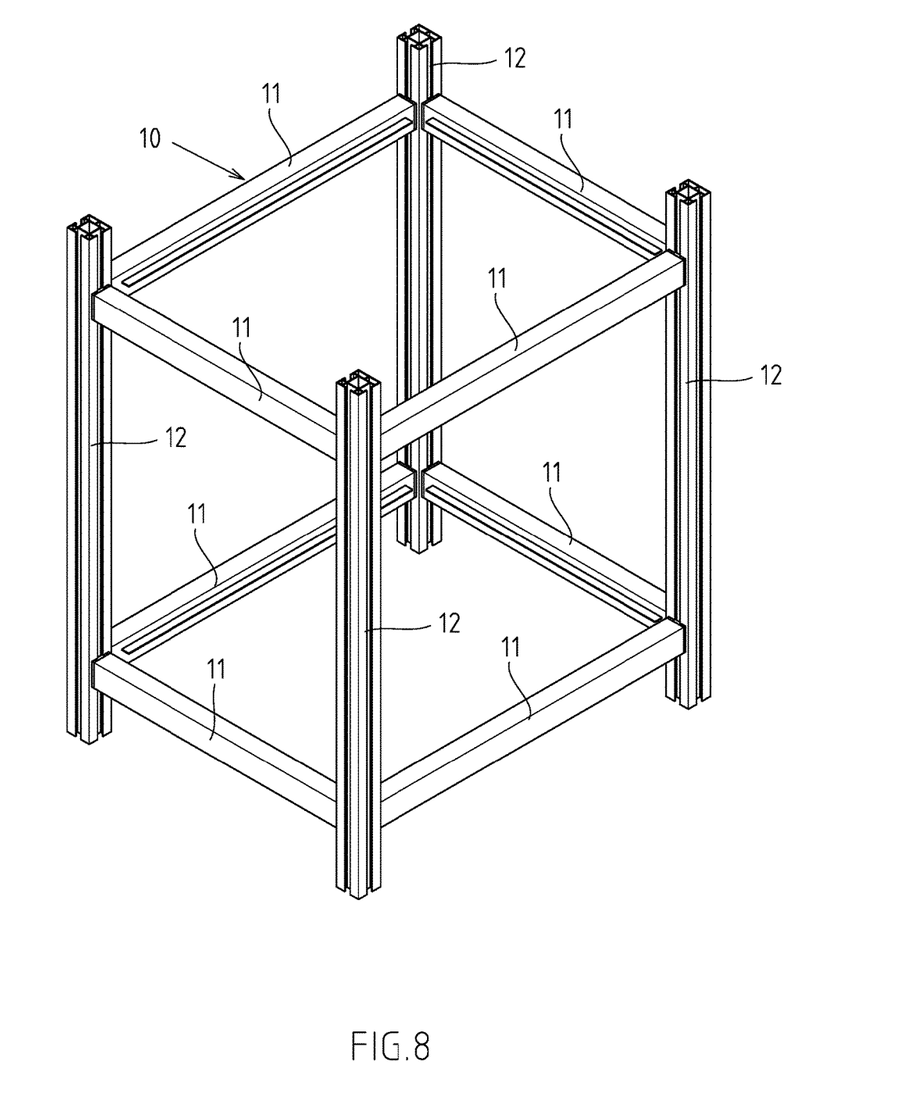
FIG. 8 is a three-dimensional assembly diagram of the second embodiment of the present invention.
Figure 9:
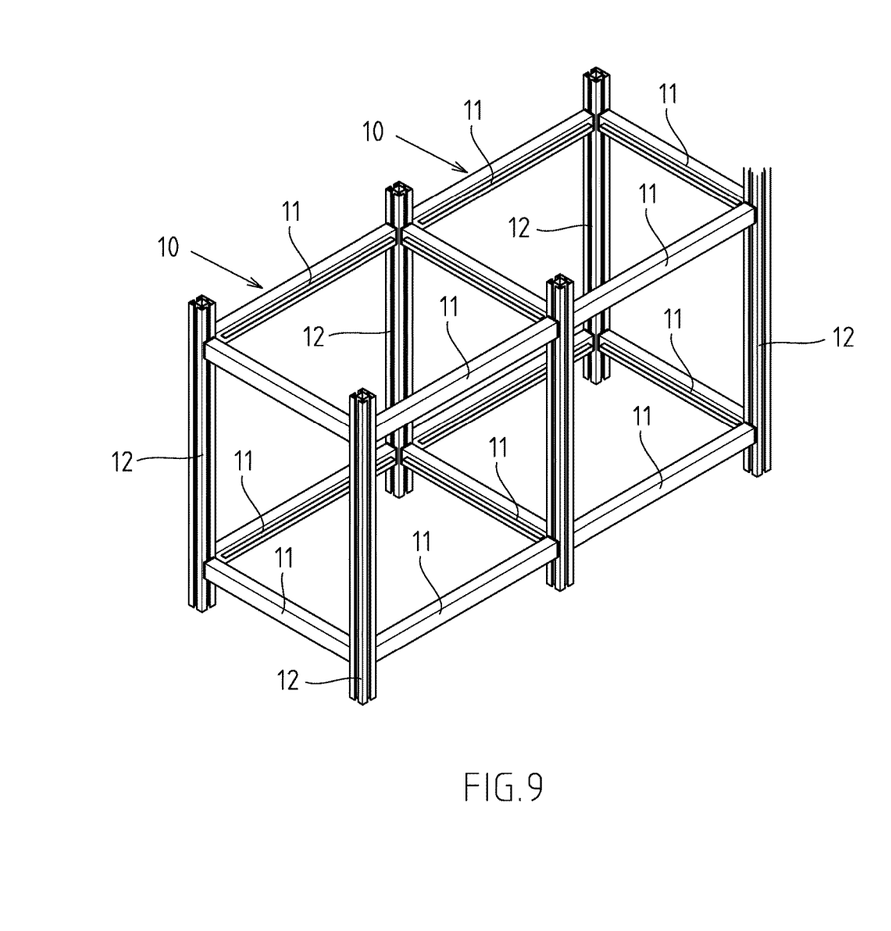
FIG. 9 is a three-dimensional assembly diagram of the second embodiment of the present invention.

FIG. 8 shows the second embodiment of the present invention. The main difference from the first embodiment is that the frame 10 can be further assembled into a rack through the extra cross bars 11 or vertical bars 12, and the connecting and positioning structure 20 is located at each corner of the rack. FIG. 9 shows the third embodiment of the present invention. The main difference from the second embodiment is that the frame 10 can form a transversely expanded double-row rack according to the user's needs through the extra cross bars 11 or vertical bars 12

We claim:

1. A frame for storing objects comprising:
a plurality of hollow horizontal cross bars;
a plurality of vertical bars, wherein each vertical bar has a plurality of vertical retaining grooves defined therein;
a plurality of fixing seats, each fixing seat having a sleeve, a plate body and a fitting groove, each sleeve having a distal end and an opposite proximal end, wherein each plate body is affixed to each distal end of each sleeve respectively, wherein each sleeve is inserted within and fixed to a corresponding end of a corresponding cross bar from said plurality of cross bars and each plate body covers each corresponding end of each corresponding cross bar respectively;
wherein each fitting groove defines an opening at a bottom of each fixing seat, wherein each fitting groove of each fixing seat defines a first groove portion in each plate body and a second groove portion in each sleeve of each fixing seat, wherein each first groove portion is arch shaped, and wherein each second groove portion of each fitting groove has a larger width than a width of each first groove portion of each fitting groove respectively;
a plurality of embedded blocks, wherein each embedded block is configured to be embedded within a corresponding retaining groove from said retaining grooves of a corresponding vertical bar from said plurality of vertical bars;
a plurality of plug-in columns, wherein each plug-in column is connected with a corresponding embedded block from said plurality of embedded blocks, wherein a shrinkage convex portion protrudes from a first end of each plug-in column and engages each corresponding embedded block from said plurality of embedded blocks respectively;
wherein a generally rectangular shaped fitting convex portion is connected to a second end of each plug-in column, wherein an arch shaped step portion is formed between each shrinkage convex portion and each fitting convex portion respectively; wherein each shrinkage convex portion is configured to be embedded into each corresponding retaining groove from said retaining grooves so that each plug-in column in unable to rotate relative to the corresponding vertical bars from said vertical bars;
wherein a fastener is inserted with a fastener hole in each fitting convex portion and penetrates each plug-in column and each embedded block respectively to secure the embedded blocks, the plug-in columns, and the fitting convex portions to the vertical bars respectively;
wherein each fitting convex portion is configured to be inserted within each second groove portion respectively and each plug-in column is configured to be inserted within each first groove portion respectively to secure the cross bars to the vertical bars respectively.

2. The frame defined in claim 1, wherein each plate body comprises a second shrinkage convex portion that is configured to be inserted within each retaining groove respectively, so that each fixing seat is prevented from being deflected relative to each vertical bar respectively.

3. The frame defined in claim 1, wherein a positioning protrusion is formed on an end face of each fitting convex portion, and a positioning groove is formed on an inner wall in each sleeve of each fitting groove; wherein each positioning protrusion is configured to be embedded in each positioning groove respectively to further secure each fitting convex portion within each fixing seat respectively.

4. The frame defined in claim 3, wherein a guide slope is formed on each inner wall of sleeve of each fixing seat.

5. The frame defined in claim 4, wherein a buckle part is protruded from a bottom edge of each sleeve; and each cross bar has a positioning hole for receiving each buckle part respectively.

\* \* \* \* \*